United States Patent [19]

Draper et al.

[11] Patent Number: 4,690,303

[45] Date of Patent: Sep. 1, 1987

[54] COUPON PACKET DISPENSING SYSTEM

[75] Inventors: Reed T. Draper; Kenneth J. Pol; Dennis R. Martin, all of Saginaw, Mich.

[73] Assignee: Draper Technologies, Inc., Saginaw, Mich.

[21] Appl. No.: 779,158

[22] Filed: Sep. 23, 1985

[51] Int. Cl.$^4$ .............................................. B65G 59/06
[52] U.S. Cl. .................................. 221/131; 221/195; 221/241; 221/267
[58] Field of Search ............... 221/129, 131, 195, 196, 221/241, 242, 251, 257, 267, 273, 194, 250, 247, 233, 235, 263

[56] References Cited

U.S. PATENT DOCUMENTS

| | | | |
|---|---|---|---|
| 701,358 | 6/1902 | Klepetar | 221/267 |
| 1,587,114 | 6/1926 | Goudeau | 221/245 X |
| 1,677,938 | 7/1928 | Van Sickle | 221/276 X |
| 1,887,197 | 11/1932 | Giles | 221/241 |
| 3,095,117 | 6/1963 | Keefe | 221/241 X |
| 4,124,109 | 11/1978 | Bissell et al. | 194/210 |
| 4,284,093 | 8/1981 | Hayashi | 133/4 A |

Primary Examiner—F. J. Bartuska
Attorney, Agent, or Firm—Learman & McCulloch

[57] ABSTRACT

A coupon packet housing defines a vertically disposed compartment for receiving a stack of substantially vertically aligned, vertically juxtaposed packets. A forwardly and rearwardly movable reciprocable floor plate underlies the compartment and has a flat surfaced, recessed portion extending rearwardly from its front end to define a generally vertically disposed dispensing shoulder which lies adjacent the rear of the compartment when the plate is in rearward position. The lowermost packet is received in the recessed portion, and is separated from the stack and then the recessed portion when the plate is respectively moved forwardly and thence returned rearwardly.

13 Claims, 10 Drawing Figures

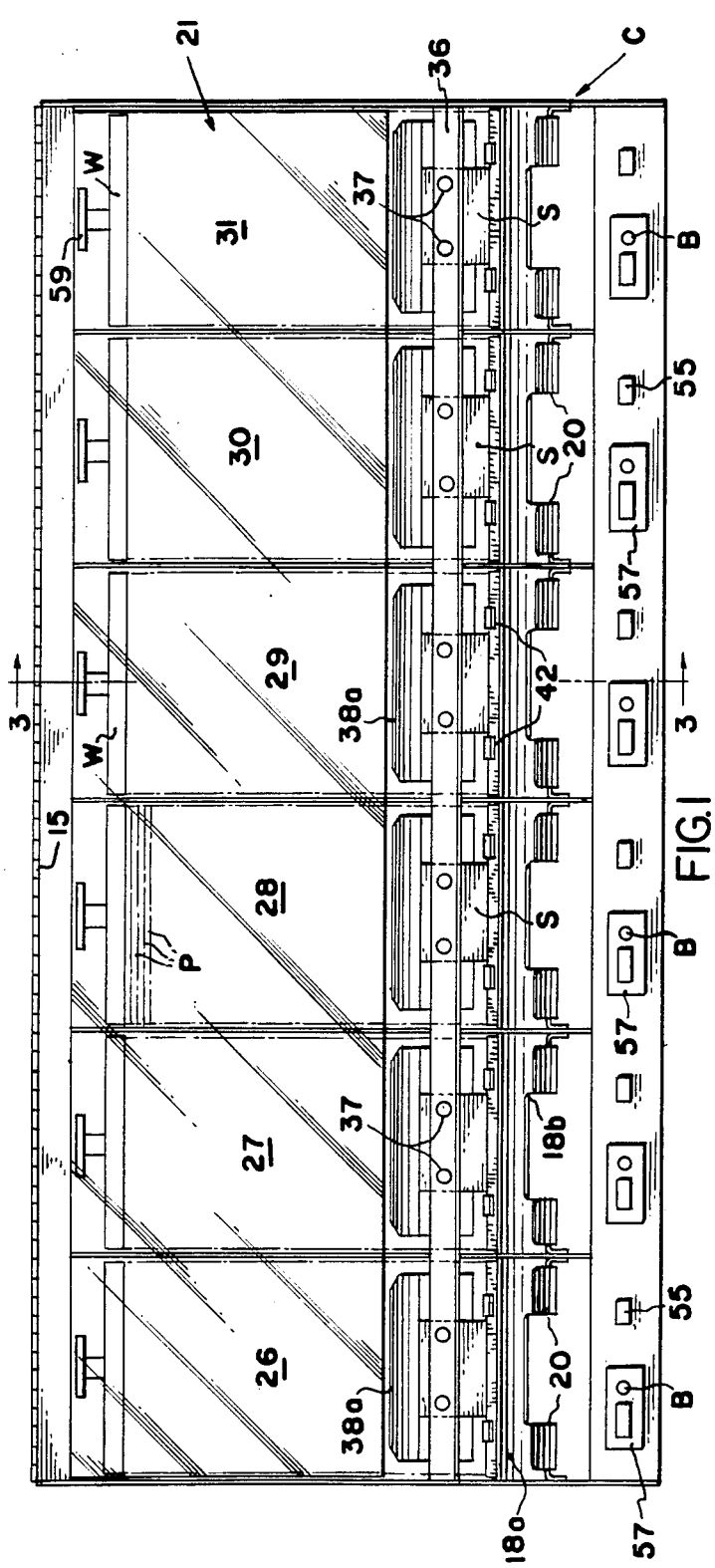
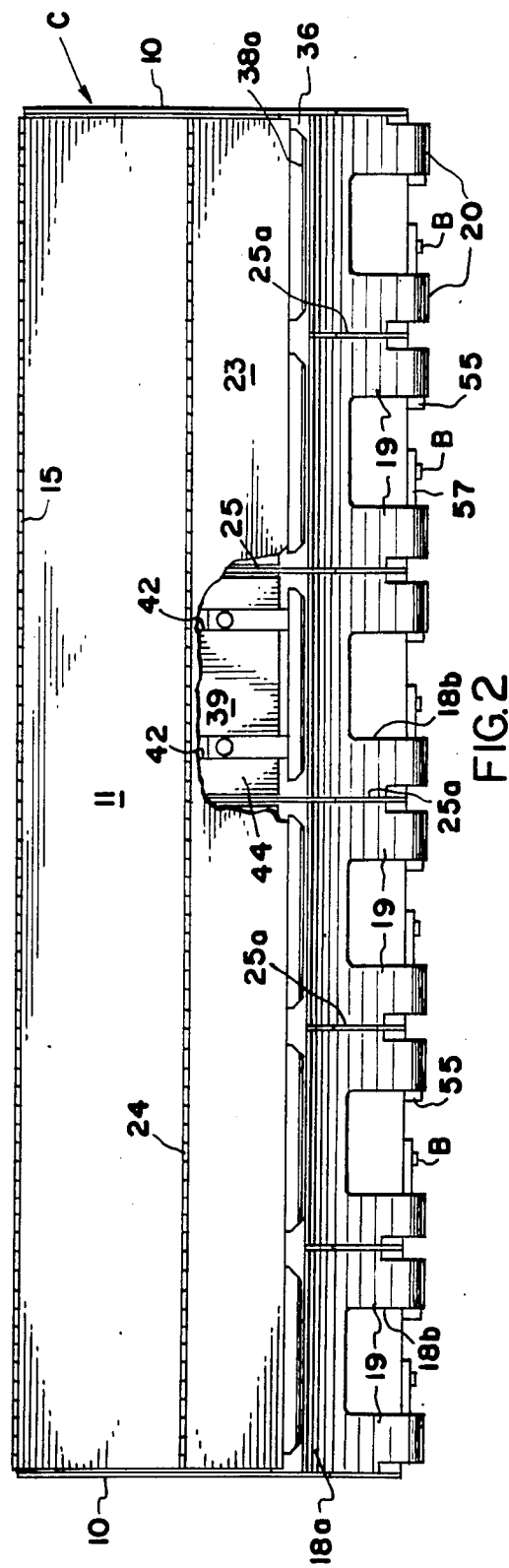

COUPON PACKET DISPENSING SYSTEM

BACKGROUND OF THE INVENTION

The present application is directed to a novel system for dispensing coupon packets and the like, on a one-at-a-time basis, from a vertical stack of such packets. In the processing of food coupons, or food stamps, as they are more popularly known, it is desirable to disburse the individual coupon packets or booklets, to the large numbers of clients receiving them at an extremely rapid rate, while at the same time, it is necessary to rigidly account for the packets being dispensed. Since such coupons are quasi-money, and the federal government spends literally billions of dollars every year on them, it is necessary that individual community offices, where these stamps are dispensed, have well managed accounting procedures.

It is the case, in many communities across the nation, that available accounting facilities have simply been overloaded, and it has not been possible to account for a large number of packets which have become "lost" in the system.

SUMMARY OF THE INVENTION

One of the prime objects of the present invention is to provide a practical and efficient packet dispensing system which assures one-at-a-time dispensing, and, accordingly, can provide an accurate record of what is disbursed, so that accounting procedures are rendered simpler, and more reliable. The system of the present invention accomplishes this, even though the coupon packets which are dispensed are often not entirely uniform in size, have different thicknesses for different monetary values, and sometimes tend to stick together.

One of the prime objects of the present invention is to design a one-at-a-time dispensing system, which is not only reliable, but expeditious, in the sense that it can handle large numbers of people in a relatively short time, thus avoiding unnecessary delays in the handling of these food coupon packets.

Another object of the invention is to provide a system which dispenses packets from the bottom of the stack in a positive manner, while restraining the next uppermost packet from moving out with the packet being dispensed, even though the packets may have a tendency to stick together.

Still another object of the invention is to provide a packet dispensing system which stacks the packets being dispensed in a discharge tray, where they can be readily grasped and removed by the disbursing officer.

Still another object of the invention is to provide a system which can be readily operated by a relatively mechanically unskilled person, and which is durable and does not need frequent adjustment or repair.

The present invention broadly utilizes a housing defining a series of vertically disposed compartments for receiving stacks of substantially vertically aligned packets. Underlying each stack is a reciprocable floor plate, having, interjacent its ends, a flat surfaced, very shallowly recessed portion defining a generally vertically disposed dispensing shoulder. When the plate is in rearward position, the lowermost packet is received in the recessed portion, and is separated from the stack when the dispensing plate is moved forwardly, and thence returned rearwardly, by a stripper which extends downwardly into the path of movement of the packet to restrain it from returning with the plate.

Other objects and advantages of the invention will be pointed out specifically or will become apparent from the following description when it is considered in conjunction with the appended claims and the accompanying drawings.

IN THE DRAWINGS

FIG. 1 is a front elevational view of a packet dispensing machine incorporating the inventions which are claimed;

FIG. 2 is a top plan view thereof, a portion of the upper part of the housing broken away to disclose some of the dispensing mechanism;

Figure 3:
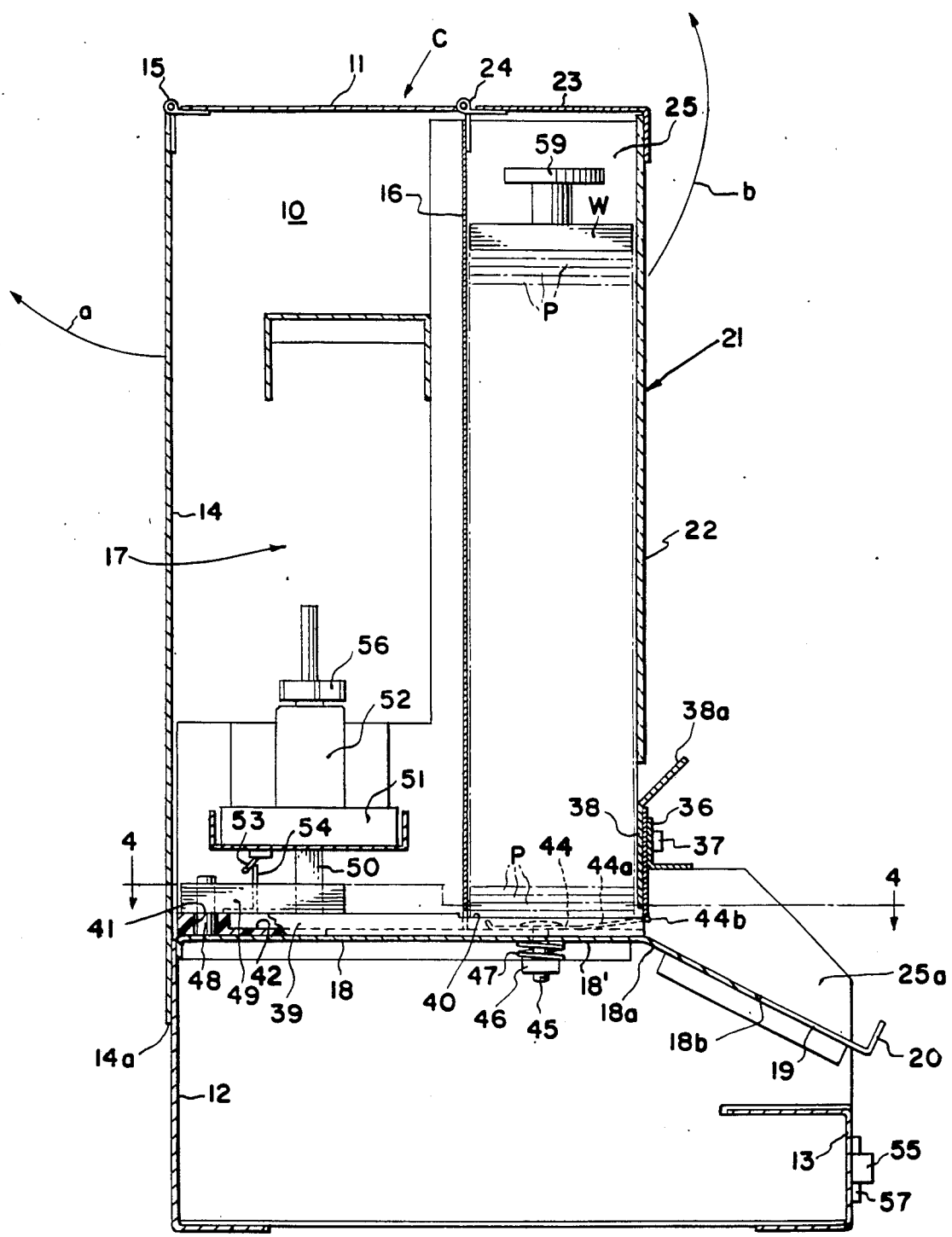
FIG. 3 is a considerably enlarged, transverse, sectional view taken on the line 3—3 of FIG. 1.

Referring now more particularly to the accompanying drawings, and in the first instance to FIGS. 1 and 2, there is disclosed a cabinet type housing, generally designated C, which comprises end walls 10, connected by a top wall 11, a fixed lower rear wall 12, and a fixed lower front wall section 13. An upwardly swingable rear wall portion 14 is hinged as at 15 to the top wall section 11, so that it may be swung upwardly in the direction . At its lower end, it laps the fixed wall portion 12, as at 14a.

The cabinet C has a series of fixed, vertical, partition wall sections 16 which function as a front wall for a rear compartment 17 formed by end walls 10, top wall section 11, and rear cover 14. As will become apparent, it is the rear compartment 17 within which the motor drive mechanisms for operating the dispensing floor plates to be later described are housed, there being a series of lower walls 18 provided for the compartment 17 to form a support floor in the housing, as shown.

As FIG. 3 indicates, the wall sections 18 each extend horizontally forwardly of the vertical wall sections 16 as at 18', and include a downwardly sloped front section 18a of predetermined length and vertical angularity, each front wall section 18a having a recess 18b defining forwardly extending fingers 19 having their front ends turned upwardly as at 20, for a purpose which later will become apparent. A swingable upper front enclosure wall 21 for the cabinet C, includes a substantially transparent front wall section 22, spanning the end walls 10, and a top wall section 23, fixed thereto, which is hingedly connected as at 24 to the wall section 16, so that it can be swung upwardly in the arc b to load stacks of coupons to the cabinet C as required.

Fixed between the wall sections 16 to extend forwardly therefrom, are a series of partitions 25, which together with the wall sections 16, 18', and 22, form a series of coupon packet compartments 26-31 (see FIG. 1) within which the packet stacks of varying denomination are received. The partitions 25 include forwardly projecting portions 25a, functioning to provide upstanding side walls adjacent the floor sections 18a, the walls 25a, and 18a defining packet discharge chutes and collection stations.

Figure 10:
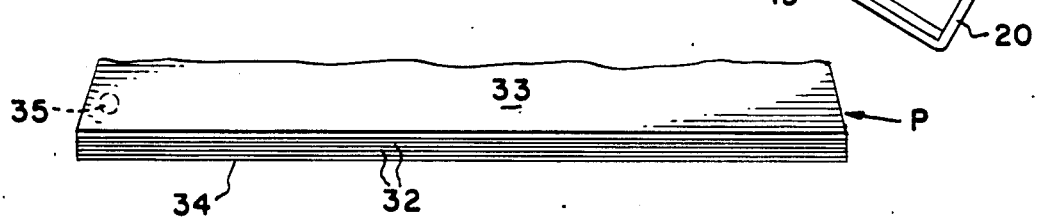
FIG. 10 is a fragmentary, perspective side elevational view of a packet of the type which can be dispensed by the system.

The packets P, for which this machine is particularly designed, are disclosed more particularly in FIG. 10 as comprising a series of coupons 32 of a particular denomination, a cover page 33, which is heavier and of a thickness equal to several of the coupons, and a bottom cover page 34, which is approximately the same thickness as the coupons themselves. The coupons and covers are adhesively joined to one another at one end edge as by drops of adhesive 35.

It is contemplated that each of the packet compartments 26-31 will house coupon packets having different over-all values, and, accordingly, these stacks of books in the various compartments will, in any one compartment, have the same thickness. However, packets of different denomination or value will differ in thickness because a different number of coupons are required to make up the different over-all packet values. It is desired that each compartment 26-31 be capable of dispensing packets having any of the different values. When the packets are received, each ten packets are separated by a pink separator slip, and further, it is necessary that this separator slip be dispensed with a packet, and not separately, in order for the accounting to be accurate.

The dispensing operation is fraught with potential problems, because the covers of the packets sometimes are exteriorly sticky, and tend to stick together, and because sometimes there is foreign matter on the packets as they are supplied for dispensing. Moreover, the packets differ in thickness at the time of dispensing them, dependent upon their location in the stack and their relative degree of compression.

Provided at the lower ends of the compartments 26-31, below the transparent front cover section 21, is an angle plate 36 which spans the walls 10 and fixes also to the partition sections 25a. Centrally secured to this plate 36, as by fastener members 37, in front of each of the compartments 26-31, is a support plate 38 having a wing portion 38a. Each plate 38 centrally supports a semi-flexible stripper S, whose operation will presently be more particularly described.

Figure 7:
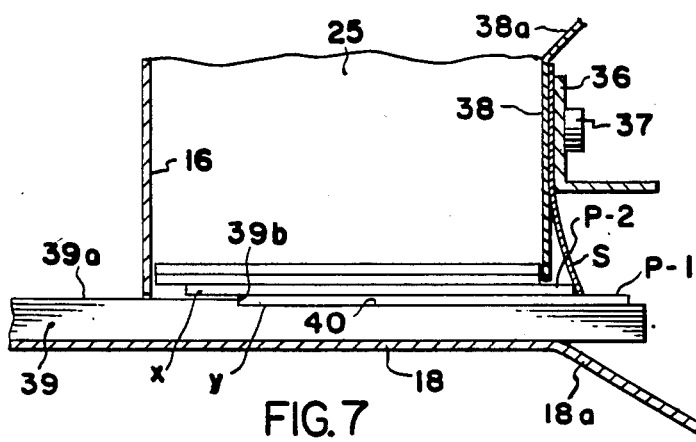
FIG. 7 is a still more enlarged, fragmentary, side elevational view illustrating the floor plate as having moved forwardly to move the lowermost packet part way out of the dispensing chamber.

Each bottom wall 18 is spaced sufficiently below the wall made up of sections 16, so as to permit the associated section 16 to freely pass a reciprocating floor plate 39, which, as FIG. 7 indicates, has a flat surfaced, shallow recess 40 provided therein to extend from its front end rearwardly to a location just rearward of the wall section 16, when the plate 39 is in the rearward position shown in FIG. 3. Recess 40 defines a vertical dispensing shoulder 39b in each plate 39, and the rear end of each plate 39 also has a flat surface 39a for a purpose which presently will become apparent.

Figure 4:
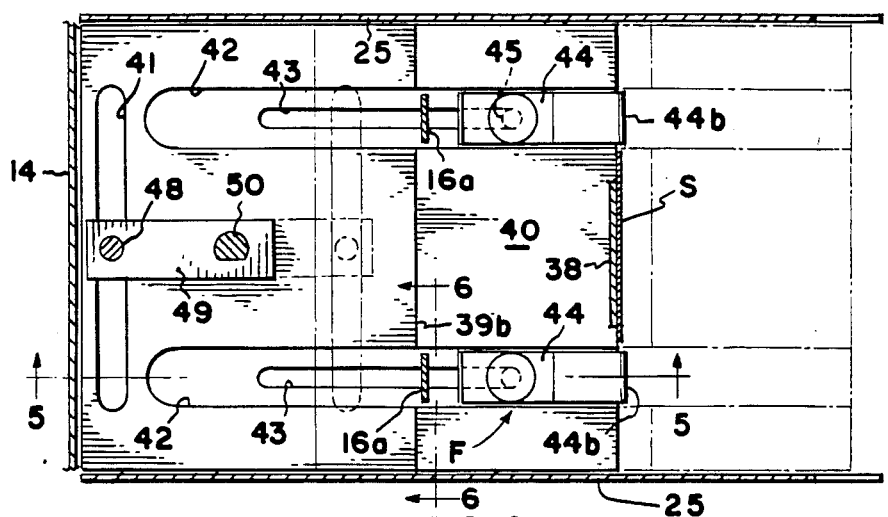
FIG. 4 is a fragmentary view, taken on the line 4—4 of FIG. 3.
Figure 5:
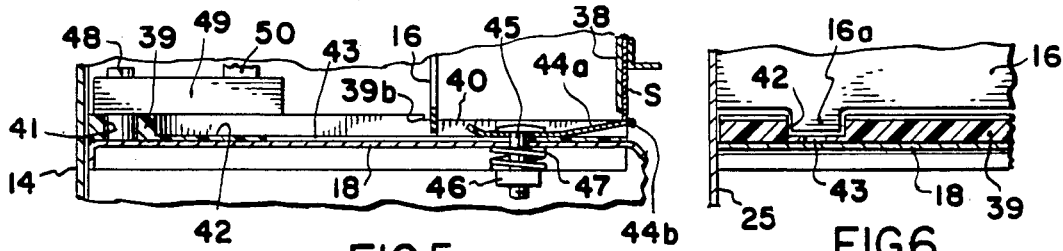
FIG. 5 is a fragmentary, cross-sectionl, elevational view, taken on the line 5—5 of FIG. 4.
Figure 6:
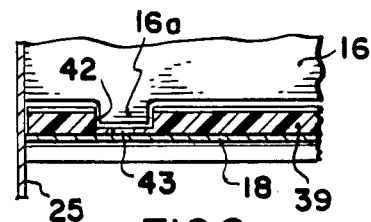
FIG. 6 is a fragmentary, sectional, elevational view, taken on the line 6—6 of FIG. 4.

Each plate 39 is formed, as disclosed particularly in FIGS. 4-6, with a rearmost, laterally extending, drive slot 41 extending parallel to shoulder 39b, and a pair of rear-to-front extending side recesses 42 which extend through to the front edge of the plate 39. Slots 43 are provided in the recesses 42 to accommodate resilient fasteners F for securing plate hold-down strips 44 to the cabinet floor members 18, the fasteners F comprising bolts 45, with nuts 46 beneath the bottom plates 18, securing compressed coil springs 47 accommodated on the bolt shanks in position.

It is to be observed that the preferably brass, flexible strips 44, which are accommodated in the recesses 42, are, at their front ends, inclined upwardly in a rear-to-front direction as at 44a, and terminate in downwardly turned lips 44b. The strips 44 function to positively horizontally guide the plates 39 in their reciprocatory travel even though the plates 39 may be slightly warped. Because the plates 44 are resiliently secured in stationary position, however, binding is avoided while "lifting" of the plates 39 is prevented. The construction described permits the plate 39 to be sufficiently thick, even though a packet P is thin, to have the required rigidity.

It will be noted that the strips 44 project slightly forwardly of the plates 39, when the plates 39 are in rearmost position. Moreover, these front portions of the spring strips 44 are, in normal position, disposed slightly above the level of each recess 40. At the time when a packet is to separate from a plate 39, the front ends of portions 44a of the members 44 bear upwardly on both ends of the packet or book. Any tendency of the packet to bind at one end or the other is avoided, and cocking or skewing of the separating packet, at the time of release, is prevented. Tabs 16a (see FIG. 6) depend from the wall sections 16 into the recesses 42 in each plate 39 to prevent the newly lowermost packet from moving rearwardly with the plate 39 as it returns to rearmost position.

As FIGS. 3 and 5 particularly illustrate, each plate 39 is moved in a fore and aft direction by a drive pin 48, dependent from a crank arm 49 mounted on the output shaft 50 of a speed reduction gear box assembly 51, driven by a motor 52. Each plate 39 is driven by a separate motor 52, through a cycle of travel which terminates when a limit switch 53, mounted on the gear box housing 51a, is contacted by an actuator arm 54 on the crank arm 49. This is, of course, only one way in which the motor can be stopped between cycles, and other options exist. Each motor 52 may be energized in the first place by a push button 55, which can be depressed to commence the cycle. If a push button 55 is held in, the plate 39 it controls will continue to cycle. Each plate 39 is driven (by a pin 48) in a manner such that there is gradual acceleration to speed, then a movement at speed to almost the end of its forward travel prior to a deceleration at the time the plate 39 is to reverse. Thence, there is again a gradual acceleration to normal speed, a period of normal speed, and, finally, at the end of the rearward travel of each plate 39, a deceleration once again. This operation, which is important to the success of the dispensing operation, is accomplished via the cranks arm 49 and drive slots 42. Provided on the motor shaft 55 of each motor 52, is a magnetic brake 56 which is operated at the end of each cycle, when the switch 53 is operated, to deenergize the motor to simultaneously brake the shaft 55, and halt the dispensing plate 39 in its rearmost position.

Also provided on the wall 13, and operated by the switch 53 or another switch, is a counter 57 which digitally displays numerically the number of packets which have been dispensed. Such counters are readily commercially available, and have reset buttons B. It is essential that the device dispense only a single packet at a time, and, when a separator sheet is reached, that that separator sheet be dispensed with a packet. Otherwise the indicating counters 57 will not properly indicate what has been dispensed. The present machine, by providing an accurate indication of the dispensing of packets to individual clients, is expected to greatly cut losses, and promote a more efficient accounting of the books which are supplied by offices in individual communities across the country.

Figure 8:
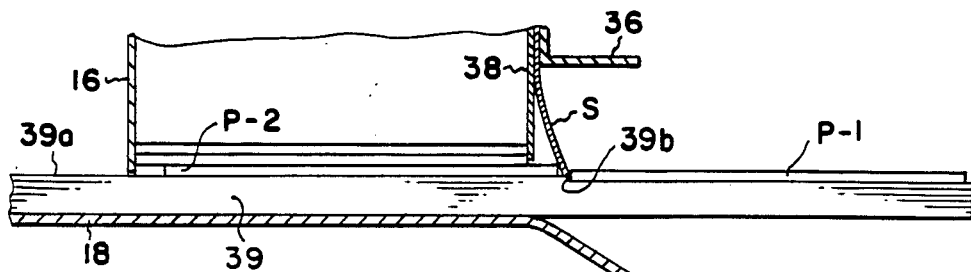
FIG. 8 is a similar view showing the floor plate in forwardmost position.

The recesses 40 are of a depth y equal to two-thirds the thickness of a packet P, when that packet is in a vertical stack which is compressed by a removable weight W, having a handle 59. When the packet is pushed beyond the stack compartment, it will expand, or increase in thickness, slightly. Also each stripper curtain S, which preferably is formed of leather of a thickness in the neighborhood of one-sixteenth of an inch so as to have some flexibility, is of a length to extend down substantially to the bottom of recess 40. This means that, when a packet is dispensed, the stripper strip S will be pivoted outwardly to the position disclosed in FIG. 7 in order to pass the packet P-1 being dispensed out from under it. As shown in FIG. 7, the next lowermost packet P-2 will move forwardly slightly also, but then will be stopped by stripper curtain S. The stripper S will prevent the next lowermost packet from proceeding outwardly with the bottommost packet, since the stripper S cannot be swung upwardly by the frictional involvement with the next lowermost packet P-2 far enough to also pass a second packet. In the FIG. 7 position, the packet P-2 is still being supported by packet P-1 and its rear end is above rear surface 39a, as shown at x. Movement of the plate 39 to the forward position in which it is shown in FIG. 8, disposes the packet P-1 in a position over the discharge trough section 18b for each of the particular compartments. It also lowers packet P-2 to the surface 39a.

Figure 9:
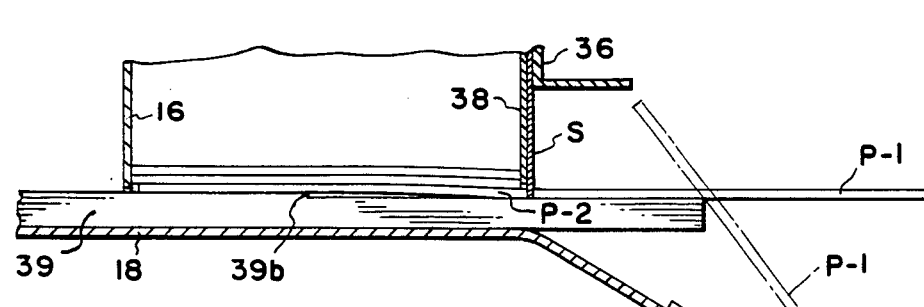
FIG. 9 is a similar view showing the floor plate as having returned rearwardly sufficiently to reach a packet dispensing position, the chain lines showing the packet being discharged to the top of the stack collecting on the discharge chute.

With withdrawal of the plate 39, the packet P-1 being dispensed will tend to move rearwardly with the plate 39. It is stripped from the plate 39, however, as the plate 39 continues to move rearwardly by the stripper S which now is reinforced by the lowered front end of the packet P-2 behind it, and, in fact, the leather stripper S is returned to vertical position by the packet P-1. At this time, the stack of packets has tipped slightly forwardly, since the front portion of the packet P-2 is received in recess 40. When the plate 39 has withdrawn such that its forward edge is beyond the front-to-rear center of gravity of the packet P-1, packet P-1 tilts, as shown at z in FIG. 9, and falls to be finally stopped by the upturned tabs 20. The angle of inclination of wall sections 18b, is steep enough in such a front-to-rear length that packets being released will lap, be released on top of, a packet previously dispensed, as particularly illustrated in FIG. 9. The next packet P-2 to be dispensed is moved back to a position vertically aligning with the stack, with further rearward movement of the plate 39.

As indicated previously, it is important that the spring members 44 extend to terminate forwardly of the plate 39 and stripper S so that cocking of the packet is prevented, as the packet releases on the retract stroke. It has been found that due to non-uniformities in the packets produced, there sometimes is a binding of one end or the other of the packet, and the purpose of the construction here is to be sure that both ends of the packet are separated from the plate 39 at the same time, and fall in non-skewed condition off the plate. The spring portions 44a bear upwardly to urge the packet (which no longer has the weight of the stack upon it) off the plate 39 at the time of separation. In so falling the front edge of any book released laps any mini-stack accumulating at tabs 20.

The stripper S is of sufficient thickness to be stiff enough to allow one book to dispense, but not two, regardless of the degree of compression of the packets. It will be understood that when a stack of packets in the compartment is considerably diminished, it will not be under the same degree of compression as a lowermost packet in a full stack.

The bolts 45, holding the spring strips 44, are positioned substantially at the front-to-rear center of the packet compartment, so that the packets will be centrally disposed over them, to achieve uniformity of compression of the springs 47 holding the strips 44 in position on the floor plates 18. Downturned flanges 44b on the plates 44, assist the stripper curtain in preventing the packet from being drawn back into the compartment, and jamming.

While one embodiment of the invention has been described in detail, it will be apparent to those skilled in the art that disclosed embodiments may be modified. Therefore, the foregoing description in all aspects is to be considered exemplary, rather than limiting in any way, and the true scope of the invention is that defined in the following claims.

What is claimed is:

1. In a coupon packet dispenser or the like; housing means defining a vertically disposed compartment receiving a stack of substantially vertically aligned, vertically juxtaposed packets; said compartment having generally vertical front and rear walls; a forwardly and return movable regid floor plate underlying said compartment and having a flat surfaced, recessed portion extending rearwardly from its front end and defining a generally vertically disposed dispensing shoulder adjacent the rear of said compartment and said rear wall when the plate is in rearward position, the recessed portion underlying the compartment so that the lowermost packet is received in said recessed portion, and opening to the front of said plate so the packet can be separated from the recessed portion when the plate is moved forwardly and thence returned; the plate having a flat surfaced rear portion for receiving the next lowermost packet and supporting the stack when the plate is moved forwardly and the shoulder removes the lowermost packet from the bottom of the stack; the said recessed portion of the plate having front to rear extending groove means thereon and the said rear wall of the compartment supporting downwardly projecting tab means which are received in said grooves to prevent famming of a lowermost packet between the said rear wall and plate when the plate is returned rearwardly; and means attached to the housing means extending downwardly to restrain the next lowermost packet from moving forwardly when the plate is moved forwardly to push the lowermost packet forwardly.

2. The dispenser of claim 1 wherein means attached to the housing means extends downwardly into the path of the packet being dispensed to aid its separation from the plate when the plate is moved in the return direction.

3. The dispenser of claim 2 wherein said means for restraining the next uppermost packet comprises a semiflexible curtain extending downwardly into the recessed portion of the plate horizontally opposite said shoulder, the lower end of the curtain depending freely to be swingable upwardly and forwardly to pass the lowermost packet while being rigid enough to restrain the next lowermost packet, and functioning also as means to aid separation of the packet being dispensed when the plate is moved in the rearward direction.

4. The dispenser of claim 3 wherein the curtain is supported at the front edge of the compartment to hang down to the level of the recessed portion of said plate and comprises a quasi-rigid leather stripper which hangs down in back of the packet being dispensed when the plate is in forward position to aid in preventing return of the packet being dispensed with the plate.

5. The dispenser of claim 4 wherein the recessed portion has a depth about two-thirds the compressed thickness of the packet to be dispensed.

6. The dispenser of claim 1 wherein a pair of laterally spaced, vertically depressible leaf springs are mounted on said housing means to extend into the path of the packet forwardly of the plate when the latter is in rearward position and tend to prevent skewing of the packet at the time of release from the plate.

7. The dispenser of claim 3 wherein the said recessed portion of said plate has a pair of fore-to-aft extending grooves constituting said groove means; a leaf spring attached to the housing means is mounted in each groove and has a depressible front end in each groove extending slightly above the groove and projecting forwardly of the plate and the curtain.

8. The dispenser of claim 7 wherein the grooves and leaf springs flank the curtain and have downturned flanges on their front ends.

9. The dispenser of claim 8 wherein said housing means has a lower horizontal wall section on which the plate reciprocates and each spring is attached to such a lower section by resilient fastening means which resiliently holds said plate down flatwise on said lower wall section while the plate reciprocates relative to said springs.

10. The dispenser of claim 1 wherein said plate has a slot in its rear end; a crank arm has a pin received in said slot; and motor means revolves said crank arm to reciprocate said plate through a cycle which includes acceleration, normal speed, and deceleration in each of the forward and return movements of the plate.

11. The dispenser of claim 1 wherein said housing means is divided into a plurality of side-by-side compartments by front-to-rear extending housing partitions, said partitions extending forwardly of said compartments and being connected by downwardly and forwardly inclined discharge chutes having upturned flanges to collect the packets dispensed in a stack; the fore-to-aft length of the chutes and angle of inclination being such relative to the fronts of said compartments that a ppcket, when released, vertically laps the rear edge of a preceding packet retained by said flanges and falls to the top of the stack collecting on each discharge chute.

12. The dispenser of claim 1 wherein said shoulder is disposed rearwardly of said compartment when the plate is in rear position.

13. In a coupon packet dispenser or the like; housing means defining a vertically disposed compartment for receiving a stack of substantially vertically aligned, vertically juxtaposed packets; a forwardly and return movable rigid floor plate underlying said compartment and having a flat surfaced, recessed portion extending rearwardly from its front end and defining a generally vertically disposed dispensing shoulder adjacent the rear of said compartment when the plate is in rearward position, the recessed portion underlying the compartment so that the lowermost packet is received in said recessed portion, and opening to the front of said plate so the packet can be separated from the recessed portion when the plate is moved forwardly and thence returned; the plate having a flat surfaced rear portion for receiving the next lowermost packet and supporting the stack when the plate is moved forwaredly and the shoulder removes the lowermost packet from the bottom of the stack; the plate having fore-to-aft extending groove means; leaf spring means attached to the housing means, mounted in the groove means and having a depressible front end extending slightly above the groove means; downturned flange means attached to said leaf spring means; and means attached to the housing means extending downwardly to restrain the next lowermost packet from moving forwardly when the plate is moved forwardly to push the lowermost packet forwardly.

* * * * *

UNITED STATES PATENT AND TRADEMARK OFFICE
CERTIFICATE OF CORRECTION

PATENT NO. : 4,690,303

DATED : September 1, 1987

INVENTOR(S) : Reed T. Draper et al

It is certified that error appears in the above-identified patent and that said Letters Patent is hereby corrected as shown below:

Column 2, line 46, insert -- a -- after "direction".

Column 6, line 32, insert -- for -- after "compartment".

Column 6, line 55, "famming" should read -- jamming --.

Column 8, line 14, "falss" should read -- falls --.

Column 8, line 35, "forwaredly" should read --forwardly--.

Signed and Sealed this

Second Day of February, 1988

Attest:

DONALD J. QUIGG

Attesting Officer

Commissioner of Patents and Trademarks